H. W. J. GRUETTNER.
DISPENSING CAN.
APPLICATION FILED MAR. 10, 1914.
1,133,134.
Patented Mar. 23, 1915.
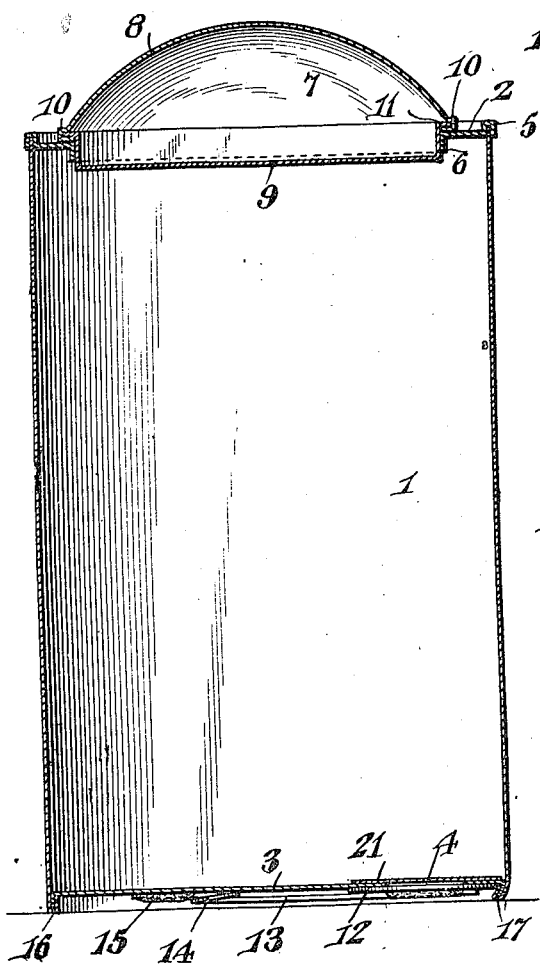
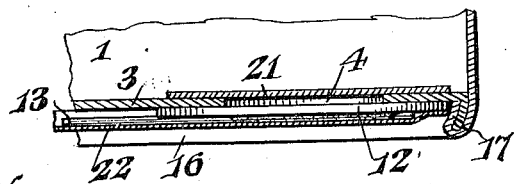
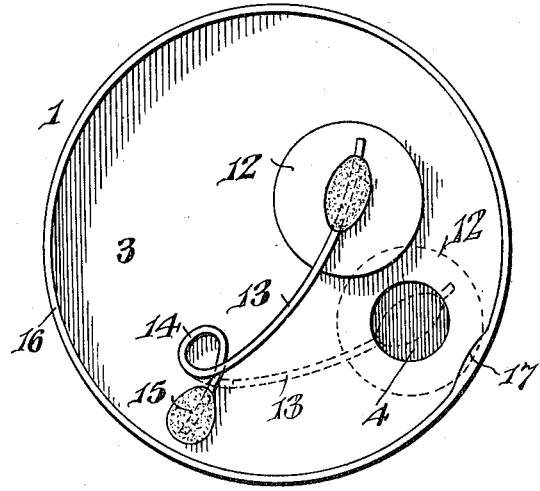
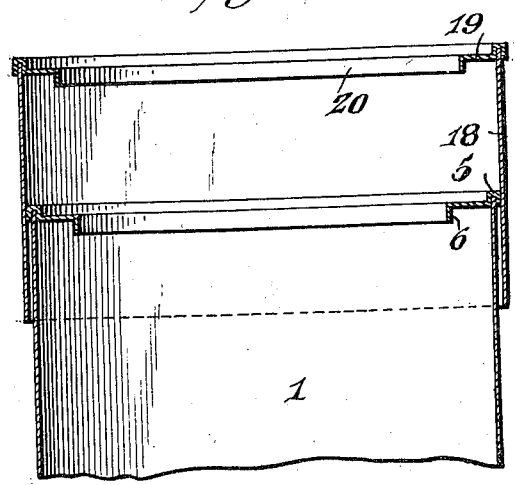
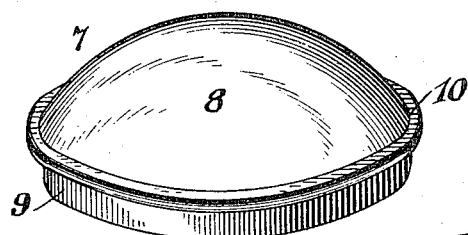
Henry W. J. Gruettner, INVENTOR

UNITED STATES PATENT OFFICE.

HENRY WILLIAM JACOB GRUETTNER, OF VALLEJO, CALIFORNIA.

DISPENSING-CAN.

1,133,134.   Specification of Letters Patent.   Patented Mar. 23, 1915.

Application filed March 10, 1914. Serial No. 823,743.

*To all whom it may concern:*

Be it known that I, HENRY W. J. GRUETTNER, a citizen of the United States, residing at Vallejo, in the county of Solano and State of California, have invented certain new and useful Improvements in Dispensing-Cans, of which the following is a specification.

The invention relates to improvements in dispensing cans.

The object of the present invention is to improve the construction of dispensing cans and to provide a simple, practical, and efficient receptacle designed particularly for ground coffee and other substances, and adapted to enable ground coffee to be packed solid under pressure, so as to exclude as much air as possible and thereby prevent the oxidation of the essential oil of coffee, which takes place when the ground coffee is exposed to a quantity of air and which continues even after such air is exhausted from the can, as occurs in preparing a vacuum or air tight receptacle.

With these and other objects in view the invention consists in the construction and novel combination of parts hereinafter fully described, illustrated in the accompanying drawings, and pointed out in the claims hereto appended, it being understood that various changes in the form, proportion, size and minor details of construction, within the scope of the claims, may be resorted to without departing from the spirit or sacrificing any of the advantages of the invention.

In the drawing:—Figure 1 is a vertical sectional view of a dispensing can constructed in accordance with this invention. Fig. 2 is a reverse plan view of the same. Fig 3 is a detail perspective view of the cover. Fig. 4 is an enlarged detail sectional view illustrating the manner of sealing the discharge aperture and for protecting the spring actuated closure. Fig. 5 is a vertical sectional view of the upper portion of the dispensing can, having an extension filling sleeve applied thereto.

Like numerals of reference designate corresponding parts in all the figures of the drawing.

In the accompanying drawing, in which is illustrated the preferred embodiment of the invention, 1 designates a dispensing can constructed of tin or other suitable material and preferably consisting of a cylindrical body provided at the top with a horizontal ring or annular member 2 forming an inwardly extending horizontal flange and having a bottom 3 with a discharge aperture 4 therein near one side of the body. The ring or annular member 2, which consists of a separate piece of material, is united at its outer periphery with the upper edge of the cylindrical body by a bead 5, and is provided at its inner edge or periphery with a vertical annular flange 6 depending from the opening in the ring or member 2 and adapted to receive a top or closure 7. The top or closure 7, which is preferably hollow, is of circular form, and is composed of inner and outer sheets or sections 8 and 9 united at their marginal edges by a bead 10. The outer plate or section 8 is of concavo-convex form and presents a rounded exterior, projecting beyond the upper end of the cylindrical body and adapted to prevent the can from standing on its top, so that in the use of the can the discharge aperture will always be located at the bottom of the can, to facilitate the ready discharge of the contents of the receptacle, and also to expose the contents to a minimum amount of air, whereby the strength of ground coffee or other material will be retained as long as possible. The inner sheet or section 9, which is substantially cylindrical, consists of a horizontal bottom portion and an annular L-shaped flange. The L-shaped flange is composed of vertical and horizontal portions and extends upwardly and outwardly, the outwardly extending horizontal portion being received within the said bead 10. The lower sheet or section 9 forms a lower reduced cylindrical portion to fit within the opening of the ring or annular member 2, and the outwardly extending portion of the flange 11 and the bead 10 provide a stop shoulder for limiting the downward or inward movement of the top or cover, which overlaps the inner portion of the ring or member 2 and provides an air tight closure.

The discharge aperture 4, which is preferably circular, is normally covered by a horizontal movable closure 12, consisting of a disk of sheet metal or other suitable material soldered or otherwise secured to the free end of a spring 13, which is adapted to oscillate horizontally from the dotted line position shown in Fig. 2 of the drawing to the full line position illustrated therein. The spring 13, which consists of resilient wire or other suitable material, is preferably provided at an intermediate point with a spring loop 14 and it is secured at its fixed end 15 to the lower face of the bottom 3 of the can by solder or other suitable means. The cylindrical body of the can is provided with a depending marginal flange 16 extending below the bottom 3 and forming a shallow exterior bottom recess of sufficient depth to receive the spring and the closure, which are supported out of contact with the supporting surface by the said flange 16. The flange 16 is preferably provided at a point opposite the discharge aperture 4 with an inwardly projecting lip or portion 17, beneath which the outer edge of the closure 12 extends, and when the said closure 12 is in its closed position, as illustrated in dotted lines in Fig. 2 of the drawings, the inwardly projecting lip 17 presents an inner or upper inclined face to the closure, and tends to hold the same against the lower face of the bottom 3. The spring 13 is designed to be of sufficient strength to maintain the closure firmly in its closed position in engagement with the depending flange 16 of the can.

The can is designed to be only large enough to hold the precise quantity of coffee or other material after pressure has been applied to the same, and in filling the can, an extension sleeve 18 is provided. The sleeve 18, which fits over the upper end of the cylindrical body, as illustrated in Fig. 5, is adapted to form an extension of the walls of the body and to hold the ground coffee or other material until the same is forced into the can under pressure, and the top or closure secured in the opening of the annular ring or member. While friction is sufficient to retain the top or closure in place, any suitable additional fastening means may, of course, be employed. The extension filling sleeve 18 preferably consists of a cylinder provided at the top with an inwardly extending annular member or ring 19, having a depending flange 20 similar to the having a depending flange 20 similar to the ring or member 2 of the dispensing can 1, and the said sleeve is adapted to slide upwardly or downwardly on the upper portion of the can, and is readily removable therefrom after the can has received its contents.

The discharge aperture is sealed by an inner or interiorly arranged sheet or piece 21 of tin foil or other suitable material, extending over the discharge aperture and secured to the upper face of the bottom 3 before the can has received its contents. Also a suitable label 22 will be pasted over the exterior of the bottom 3. This label, which coöperates with the upper sealing member 21, also serves to protect the spring and the closure, and it seals the can so that access to the contents thereof cannot be had without plainly disclosing the fact, thereby rendering the can non-refillable and protecting a consumer against fraudulent adulterations and the like.

What is claimed is:

1. A dispensing can including a body provided with a horizontal bottom and having a depending flange supporting the bottom above the lower edge of the can and providing a bottom recess, said bottom being provided adjacent the flange with a discharge aperture, a closure consisting of a plate or piece fitted against the lower face of the bottom and slidable over the same to and from the said discharge aperture and being arranged in contact with the said flange when in its closed position, and a spring secured at one end to the bottom and having its other end free and carrying the closure, said spring being provided at a point intermediate of its ends with a spring coil and adapted to normally urge the closure toward its closed position and maintain the same in contact with the depending flange.

2. A dispensing can consisting of a body having a bottom provided with a discharge aperture located adjacent to one side of the body, said body being also provided with a depending supporting flange having a projecting lip, a spring arranged at the lower face of the bottom and secured at one end, and a closure carried by the spring and slidable over the bottom and normally maintained by the spring in engagement with the lip of the flange, the latter forming a stop for the closure.

3. A dispensing can consisting of a body having a bottom provided with a discharge aperture located adjacent to one side of the body, said body being also provided with a depending stop flange and having a projecting lip extending inwardly from the lower edge of the flange, a spring secured at one end to the can at the lower face of the bottom, a closure carried by the other end of the spring and slidable over the bottom to and from the discharge aperture and normally maintained by the spring in its closed position and in engagement with the lip of the flange, the latter forming a stop for the closure and the lip presenting an inclined upper face to the closure to hold the same tightly against the bottom.

In testimony whereof I affix my signature in presence of two witnesses.

HENRY WILLIAM JACOB GRUETTNER.

Witnesses:
R. GRUETTNER,
W. M. MONTGOMERY.